United States Patent
Salter et al.

(10) Patent No.: US 11,548,379 B2
(45) Date of Patent: Jan. 10, 2023

(54) ELECTRIFIED VEHICLE INCLUDING REMOTE TERMINALS ACCESSIBLE VIA CHARGING PORT DOOR

(71) Applicant: Ford Global Technologies, LLC, Dearborn, MI (US)

(72) Inventors: Stuart C. Salter, White Lake, MI (US); Michael Blischke, Northville, MI (US); David Brian Glickman, Southfield, MI (US); John Budaj, Dearborn, MI (US); Paul Kenneth Dellock, Northville, MI (US); Katherine Howard-Cone, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 200 days.

(21) Appl. No.: 17/166,007

(22) Filed: Feb. 3, 2021

(65) Prior Publication Data
US 2022/0242227 A1 Aug. 4, 2022

(51) Int. Cl.
*B60K 15/05* (2006.01)
*B60L 53/16* (2019.01)
(Continued)

(52) U.S. Cl.
CPC .............. *B60K 15/05* (2013.01); *B60L 53/16* (2019.02); *B60K 2015/0507* (2013.01); *B60K 2015/0546* (2013.01); *B60K 2015/0561* (2013.01); *B60L 2270/32* (2013.01); *E05Y 2900/534* (2013.01); *H01R 13/447* (2013.01);
(Continued)

(58) Field of Classification Search
CPC .................. B60K 15/05; B60K 15/053; B60K 2015/0507; B60K 2015/0546; B60K 2015/0561; B60K 2015/0515; B60L 53/10; B60L 53/16; B60L 2270/32; E05Y 2900/534; Y02T 90/14; B60R 16/02;
(Continued)

(56) References Cited

U.S. PATENT DOCUMENTS 4,807,895 A 2/1989 Thomas et al.
6,646,416 B2 * 11/2003 Streuer ............... H01R 11/289
320/107
(Continued)

FOREIGN PATENT DOCUMENTS

KR 100494588 B1 6/2005
WO WO-2019221653 A1 * 11/2019 .............. B60L 50/00

*Primary Examiner* — Dennis H Redder
*Assistant Examiner* — Joyce Eileen Hill
(74) *Attorney, Agent, or Firm* — Vichit Chea; Carlson, Gaskey & Olds, P.C.

(57) ABSTRACT

This disclosure relates to an electrified vehicle having remote terminals accessible via a charging port door. An example electrified vehicle a charging port configured to couple to a plug to charge the electrified vehicle, and remote terminals. The electrified vehicle can be jump started via the remote terminals. Further, the electrified vehicle includes a charging port door moveable between a closed position, a normal open position in which the charging port is accessible such that a plug may couple to the charging port to charge the electrified vehicle, and an extended open position in which the charging port door has moved beyond the normal open position. The remote terminals are accessible when the charging port door is in the extended open position.

20 Claims, 4 Drawing Sheets

(51) Int. Cl.
*H01R 13/447* (2006.01)
*H01R 13/52* (2006.01)

(52) U.S. Cl.
CPC ...... *H01R 13/5213* (2013.01); *H01R 2201/26* (2013.01); *Y02T 90/14* (2013.01)

(58) Field of Classification Search
CPC .. H01R 2201/26; H01R 13/44; H01R 13/447; H01R 13/5213
USPC .......................... 296/97.22; 49/386; 320/109
See application file for complete search history.

(56) References Cited

U.S. PATENT DOCUMENTS

| | | |
|---|---|---|
| 7,364,457 B2 | 4/2008 | Mehki |
| 9,193,274 B2 | 11/2015 | Pursifull |
| 10,023,056 B2 | 7/2018 | Weicker |
| 10,363,824 B1 | 7/2019 | Lumpkin |
| 2006/0232901 A1 | 10/2006 | Bierbaum et al. |
| 2017/0197515 A1* | 7/2017 | Southey ................. B60K 15/05 |
| 2018/0086219 A1* | 3/2018 | Malek ................... B60L 53/305 |
| 2018/0215254 A1* | 8/2018 | Jobst .................... H01R 13/447 |
| 2018/0251037 A1 | 9/2018 | Alvarez Ruiz et al. |

* cited by examiner

ELECTRIFIED VEHICLE INCLUDING REMOTE TERMINALS ACCESSIBLE VIA CHARGING PORT DOOR

TECHNICAL FIELD

This disclosure relates to an electrified vehicle having remote terminals accessible via a charging port door.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

The traction battery is a relatively high-voltage battery that selectively powers the electric machines and other electrical loads of the electrified vehicle. The traction battery of a plug-in electrified vehicle may be charged at public or private electrified vehicle charging stations, for example. Plug-in electrified vehicles include a charging port configured to couple to a plug of the electrified vehicle charging station. When the plug is coupled to the charging port, the electrified vehicle charging station may charge the traction battery.

SUMMARY

An electrified vehicle according to an exemplary aspect of the present disclosure includes, among other things, a charging port configured to couple to a plug to charge the electrified vehicle, and remote terminals. The electrified vehicle can be jump started via the remote terminals. Further, the electrified vehicle includes a charging port door moveable between a closed position, a normal open position in which the charging port is accessible such that a plug may couple to the charging port to charge the electrified vehicle, and an extended open position in which the charging port door has moved beyond the normal open position. The remote terminals are accessible when the charging port door is in the extended open position.

In a further non-limiting embodiment of the foregoing electrified vehicle, when the charging port door is in the closed position, the charging port door covers and prevents access to both the charging port and the remote terminals.

In a further non-limiting embodiment of any of the foregoing electrified vehicles, when the charging port door is in the normal open position, the remote terminals are inaccessible.

In a further non-limiting embodiment of any of the foregoing electrified vehicles, when the charging port door is in the closed and normal open positions, a flap covers the remote terminals.

In a further non-limiting embodiment of any of the foregoing electrified vehicles, when the charging port door is in the extended open position, the flap is permitted to move such that the remote terminals are accessible.

In a further non-limiting embodiment of any of the foregoing electrified vehicles, the flap is biased toward a position in which the remote terminals are accessible.

In a further non-limiting embodiment of any of the foregoing electrified vehicles, the charging port door is moveable relative to the charging port via an arm.

In a further non-limiting embodiment of any of the foregoing electrified vehicles, the remote terminals and the flap are on the arm.

In a further non-limiting embodiment of any of the foregoing electrified vehicles, the remote terminals and flap are adjacent the arm, and the arm includes a tab configured to move the flap to expose the remote terminals as the charging port door moves from the normal open position to the extended open position.

In a further non-limiting embodiment of any of the foregoing electrified vehicles, when the remote terminals are accessible, the flap covers the charging port such that a plug cannot be plugged into the charging port.

In a further non-limiting embodiment of any of the foregoing electrified vehicles, the charging port door is moveable relative to the charging port via an arm, the arm includes a notch, and when the charging port door is in the extended open position, the remote terminals are accessible via the notch.

In a further non-limiting embodiment of any of the foregoing electrified vehicles, when the charging port door is in the normal open position, a first set of instructions for moving the charging port door to the extended open position are visible.

In a further non-limiting embodiment of any of the foregoing electrified vehicles, when the charging port door is in the extended open position, a second set of instructions for jump starting the electrified vehicle via the remote terminals are visible.

In a further non-limiting embodiment of any of the foregoing electrified vehicles, the charging port door is rotatable between the closed, normal open, and extended open positions.

In a further non-limiting embodiment of any of the foregoing electrified vehicles, when in the extended open position, the charging port door is rotated about 30° beyond the normal open position.

In a further non-limiting embodiment of any of the foregoing electrified vehicles, the charging port is electrically coupled to a first battery capable of delivering power to propel the electrified vehicle, and the remote terminals are electrically coupled to a second battery having a voltage less than the first battery.

A method according to an exemplary aspect of the present disclosure includes, among other things, moving a charging port door beyond a normal open position to an extended open position in which remote terminals are accessible. Further, an electrified vehicle can be jump started via the remote terminals.

In a further non-limiting embodiment of the foregoing method, the remote terminals are inaccessible when the charging port door is in the normal open position.

In a further non-limiting embodiment of any of the foregoing methods, a flap covers the remote terminals when the charging port door is in the normal open position, and the moving step causes the flap to move such that the remote terminals are accessible.

In a further non-limiting embodiment of any of the foregoing methods, the moving step causes the flap to move such that a charging port is covered by the flap.

BRIEF DESCRIPTION OF THE DRAWINGS

FIG. 2 is a view of a first embodiment of this disclosure. In FIG. 2, a charging port door is in a normal open position.

FIG. 5 is a view of a second embodiment of this disclosure. In FIG. 5, a charging port door is in a normal open position.

FIG. 7 is a view of a third embodiment of this disclosure. In FIG. 7, a charging port door is in a normal open position.

DETAILED DESCRIPTION

This disclosure relates to an electrified vehicle having remote terminals accessible via a charging port door. An example electrified vehicle a charging port configured to couple to a plug to charge the electrified vehicle, and remote terminals. The electrified vehicle can be jump started via the remote terminals. Further, the electrified vehicle includes a charging port door moveable between a closed position, a normal open position in which the charging port is accessible such that a plug may couple to the charging port to charge the electrified vehicle, and an extended open position in which the charging port door has moved beyond the normal open position. The remote terminals are accessible when the charging port door is in the extended open position. This disclosure provides convenient access to the battery terminals via the remote terminals. These and other benefits will be appreciated from the following written description.

Figure 1:
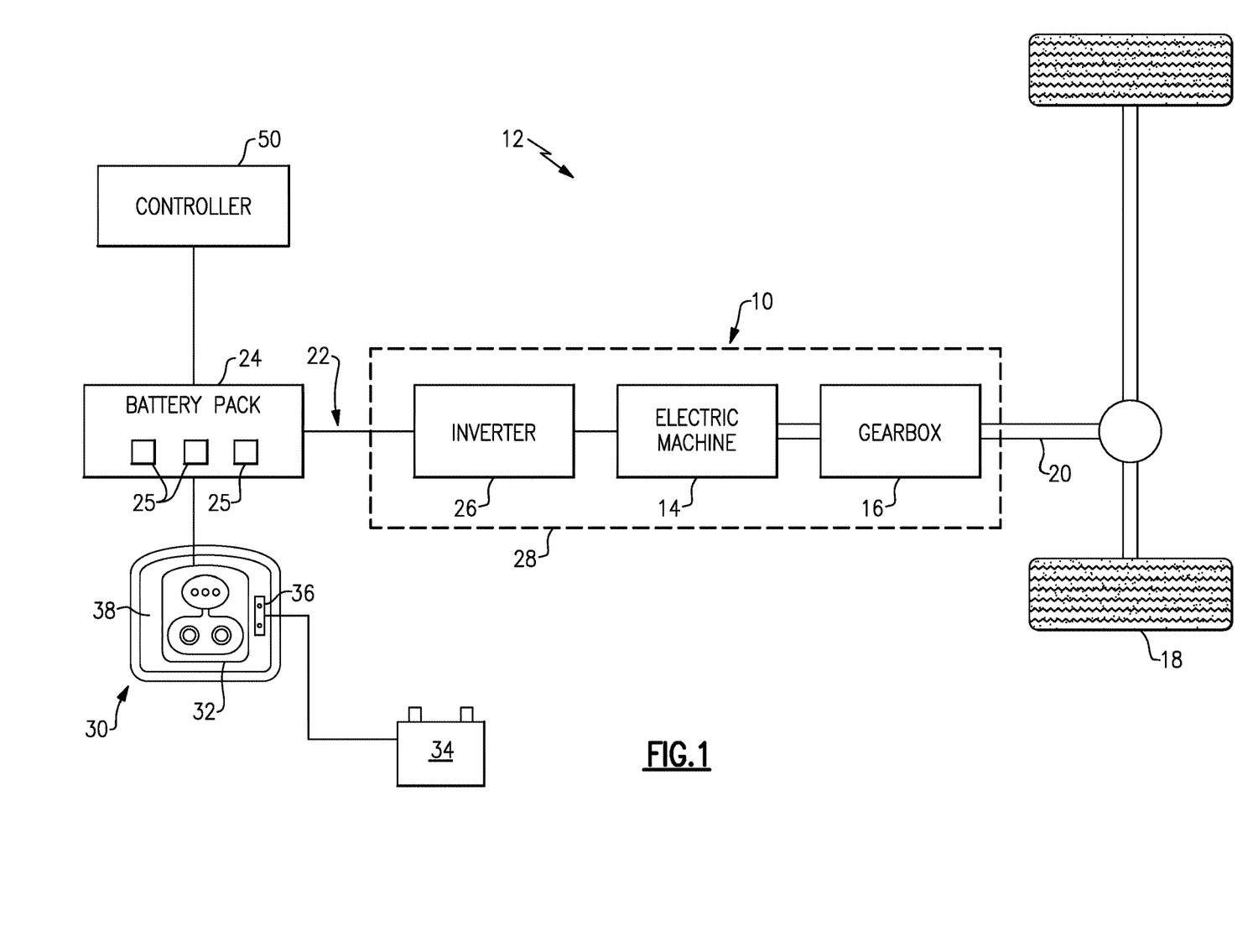
FIG. 1 schematically illustrates various components, including a powertrain, of an electrified vehicle.

FIG. 1 schematically illustrates a powertrain 10 of an electrified vehicle 12. Although depicted as a battery electric vehicle (BEV), it should be understood that the concepts described herein are not limited to BEVs and could extend to other electrified vehicles, including other plug-in electrified vehicles such as plug-in hybrid electric vehicles (PHEVs). Therefore, although not shown in this embodiment, the electrified vehicle 12 could be equipped with an internal combustion engine that can be employed either alone or in combination with other energy sources to propel the electrified vehicle 12.

In a non-limiting embodiment, the electrified vehicle 12 is a full electric vehicle propelled solely through electric power, such as by an electric machine 14, without any assistance from an internal combustion engine. The electric machine 14 may operate as an electric motor, an electric generator, or both. The electric machine 14 receives electrical power and provides a rotational output power. The electric machine 14 may be connected to a gearbox 16 for adjusting the output torque and speed of the electric machine 14 by a predetermined gear ratio. The gearbox 16 is connected to a set of drive wheels 18 by an output shaft 20. A high voltage bus 22 electrically connects the electric machine 14 to a battery pack 24 through an inverter 26. The electric machine 14, the gearbox 16, and the inverter 26 may collectively be referred to as a transmission 28.

The battery pack 24 is an energy storage device and, in this example, is an exemplary electrified vehicle battery. The battery pack 24 may be a high voltage traction battery pack that includes a plurality of battery assemblies 25 (i.e., battery arrays or groupings of battery cells) capable of outputting electrical power to operate the electric machine 14, and in turn to propel the electrified vehicle 12, and/or other electrical loads of the electrified vehicle 12. Other types of energy storage devices and/or output devices can also be used to electrically power the electrified vehicle 12.

The electrified vehicle 12 may also include a charging system 30 for periodically charging the cells of the battery pack 24. The charging system 30 may be connected to an external power source, such as an electrical grid, for receiving and distributing power to the cells.

In one non-limiting embodiment, the charging system 30 includes a charging port 32 located on-board the electrified vehicle 12. The charging port 32 is adapted to selectively receive power from an external power source, such as from a power cable connected to the external power source, and then distribute the power to the battery pack 24 for charging the cells. The charging port 32 is configured to couple to plugs associated with an electrified vehicle charging station, such as plugs supplying alternating current (AC) power (i.e., the charging port 32 is an "AC charging port" and couples to an "AC plug") or direct current (DC) power (i.e., the charging port 32 is a "DC charging port" and couples to a "DC plug"). The charging port 32 may accommodate one or more conventional voltage sources from the external power supply (e.g., 110 volt, 220 volt, etc.).

The electrified vehicle 12 also includes one or more auxiliary batteries. Such auxiliary batteries are configured to provide power to one or more electrical loads of the electrified vehicle 12, such as standard automotive accessories designed to run on relatively low voltages, such as 12 Volts. As examples, auxiliary batteries may power keyless entry systems of the electrified vehicle 12, an electronic hood latch, and/or other systems. In this example, the electrified vehicle 12 includes an auxiliary battery 34, which in the example is a 12 Volt battery.

In some circumstances, such as when an electrified vehicle 12 is left unattended for an extended period of time, the auxiliary battery 34 may become depleted and require a jump start. In this disclosure, remote terminals 36 are provided which permit jump starting of the auxiliary battery 34. The remote terminals 36 are configured to electrically connect another battery, such as the battery of another vehicle, to the auxiliary battery 34 such that a temporary electrical connection is made between the two batteries.

The remote terminals 36 are remote from the auxiliary battery 34. The auxiliary battery 34 may include another set of terminals mounted directly to the auxiliary battery 34. The remote terminals 36 permit one to jump start the auxiliary battery 34 in situations where the auxiliary battery 34 either cannot be accessed or is difficult to access. For instance, if the auxiliary battery 34 is arranged under a hood that is held closed by an electronic hood latch, a user may not be able to access the auxiliary battery 34 via the hood if the auxiliary battery 34 is depleted. In such situations, the electrified vehicle 12 can be jump started via the remote terminals 36 even when the hood cannot be unlatched. In this disclosure, reference to jump starting the electrified vehicle 12 includes any temporary electrical connection between a battery and the auxiliary battery 34 that restores a charge to the auxiliary battery 34, whether or not that temporary electrical connection is actually used to jump start the electrified vehicle 12. For instance, if the temporary electrical connection is used to restore a charge to the auxiliary battery 34 such that the auxiliary battery 34 could activate an electronic hood latch or keyless entry system, that would be considered a jump start in this disclosure.

In this disclosure, the remote terminals 36 are arranged adjacent the charging port 32. In particular, the remote terminals 36 are arranged in a common recess 38 with the charging port 32, which increases the ease of accessing the remote terminals 36. On the other hand, the remote terminals 36 are not exposed or accessible during normal use of the charging port 32. Rather, this disclosure includes a number of embodiments that require a user to selectively expose the remote terminals 36.

Figure 2:
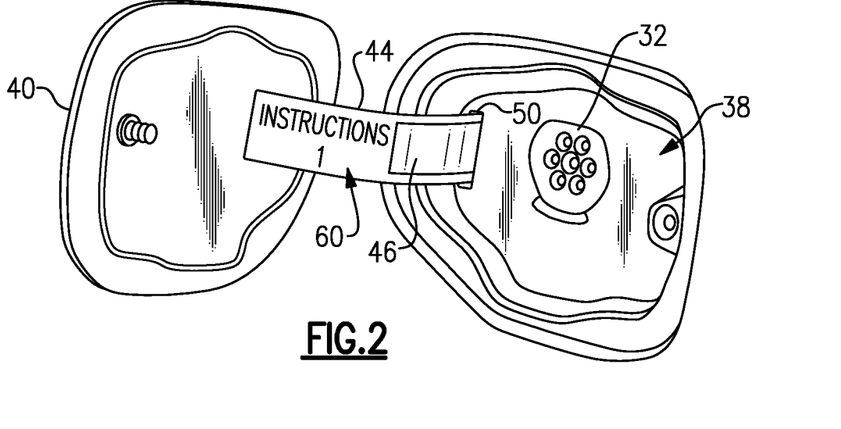
Figure 3:
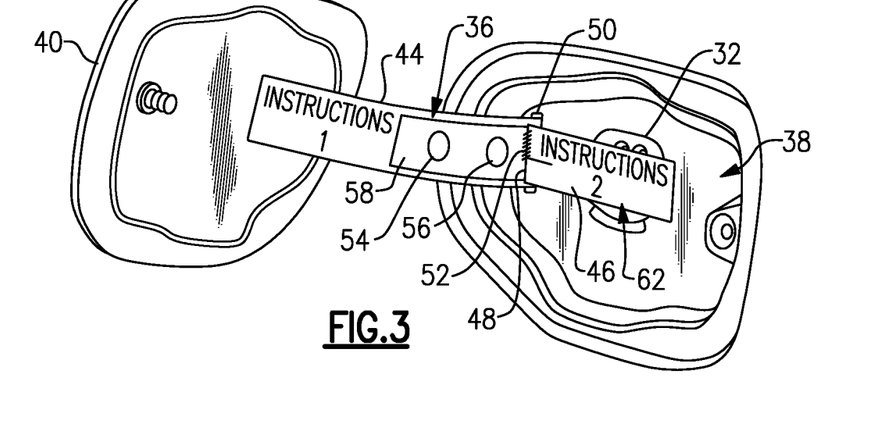
FIG. 3 is a view of the first embodiment of this disclosure with the charging port door in an extended open position.

FIGS. 2 and 3 illustrate a first embodiment of this disclosure. With reference to FIGS. 2 and 3, the charging port 32 is arranged in the recess 38 and is selectively covered by a charging port door 40. In FIG. 2, the charging port door 40 is a normal open position in which the charging port 32 is exposed and a plug of a charging station may be plugged into the charging port 32. When the charging port door 40 is in the normal open position, the remote terminals 36 are not accessible.

The charging port door 40 may be held in the normal open position by one or more detents or deflectable tabs, as examples. The charging port door 40 may be firmly held in that position such that when a normal level of force is applied to the charging port door 40, the charging port door 40 resists movement beyond the normal open position. The charging port door 40 may be held in the normal open position firmly such that a user feels as though the normal open position is as far as the charging port door 40 will rotate. As explained below, however, the charging port door 40 can be moved to an extended open position beyond the normal open position upon application of additional force.

Figure 4:
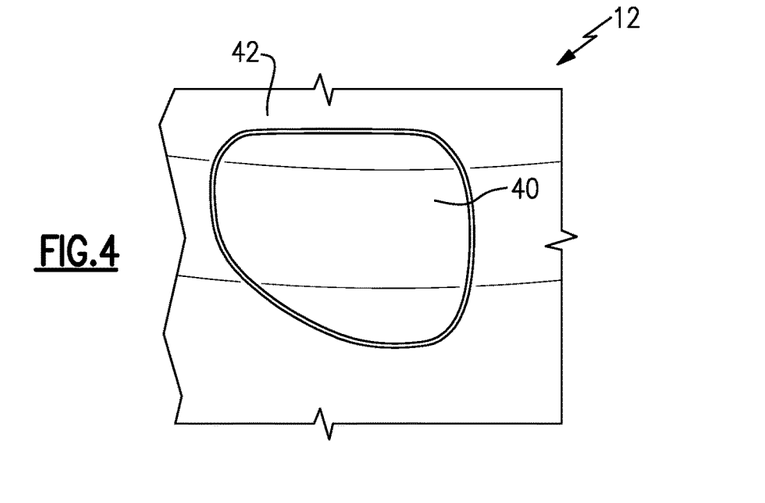
FIG. 4 is view of the charging port door in a closed position.

FIG. 4 is representative of the charging port door 40 in a closed position in which the charging port door 40 covers the recess 38 and sits substantially flush with an adjacent portion 42 of the body panel of the electrified vehicle 12. When the charging port door 40 is in the closed position, the charging port door 40 covers and prevents access to both the charging port 32 and the remote terminals 36.

With reference back to FIGS. 2 and 3, the charging port door 40 is moveably connected to the electrified vehicle 12 via an arm 44. The arm 44 is pivotably attached to the electrified vehicle 12 adjacent the recess 38 to permit movement, specifically rotation, of the charging port door 40 between the closed position of FIG. 4, the normal open position of FIG. 2, and the extended open position of FIG. 3, which will now be described.

The charging port door 40 is shown in the extended open position in FIG. 3. The extended open position is a position in which the charging port door 40 has been moved past the normal open position. In an example, to move the charging port door 40 to the normal open position, the charging port door 40 is rotated 30° beyond the normal open position. While the charging port door 40 is rotatable between the closed, normal open, and extended open positions, the charging port door 40 could be configured to move in another manner between the various positions. For instance, the charging port door 40 could be linearly moveable in addition to or as an alternative to being rotatable.

In the extended open position, the remote terminals 36 are accessible. In the embodiment of FIGS. 2 and 3, the remote terminals 36 are attached to the arm 44 and are selectively covered by a rotatable flap 46. The flap 46 is mounted to an inner surface of the arm 44, which generally faces the recess 38. The flap 46 is configured to rotate about a hinged end 48 to selectively cover and uncover the remote terminals 36.

When the charging port door 40 is in both the closed and normal open positions, the arm 44 is arranged in a slot 50 such that the hinged end 48 is also within the slot 50. In these positions, structure forming the slot 50 holds the flap 46 in a position such that the flap 46 covers the remote terminals 36, which in turn prevents access to the remote terminals 36. When the charging port door 40 is moved to the extended open position, however, the arm 44 is moved further out of the slot 50 exposing the hinged end 48 and permitting the flap 46 to rotate away from the arm 44 under the bias of a spring 52 mounted adjacent the hinged end 48. Thus, in the extended open position, the remote terminals 36 are accessible such that the auxiliary battery 34 may be jump started. Further, in the extended open position, the flap 46 substantially covers the charging port 32 to prevent inadvertent contact between a jump start cable and the charging port 32.

The remote terminals 36 are provided by first and second lugs 54, 56, which are posts configured to connect to positive and negative jump start cables. The first and second lugs 54, 56 are electrically connected to the auxiliary battery 34 via one or more wires that extend at least partially through the arm 44. The arm 44 may include an elastomeric pad 58, such as a rubber pad, surrounding the first and second lugs 54, 56 to assist with connecting jump start cables to the first and second lugs 54, 56 and to assist with sealing the flap 46 against the arm 44. The first lug 54 may be a positive lug electronically connected to a positive terminal of the auxiliary battery 34, and the second lug 56 may be a negative lug electronically connected to a negative terminal of the auxiliary battery 34.

In a further aspect of this disclosure, instructions for exposing and using the remote terminals 36 are provided. In this example, a first set of instructions 60 is provided on the arm 44 between the flap 46 and the charging port door 40. The first set of instructions 60 explains that a user must move the charging port door 40 to the extended open position in order to expose the remote terminals 36. A second set of instructions 62 is provided on a surface of the flap 46 generally facing the arm 44 such that when the second set of instructions 62 are visible when the charging port door 40 is in the extended open position. The second set of instructions explains how to use the remote terminals 36 to jump start the auxiliary battery 34. The first and second sets of instructions 60, 62 may be painted on, molded into the arm 44 and/or flap 46, or provided by labels, as examples.

Figure 5:
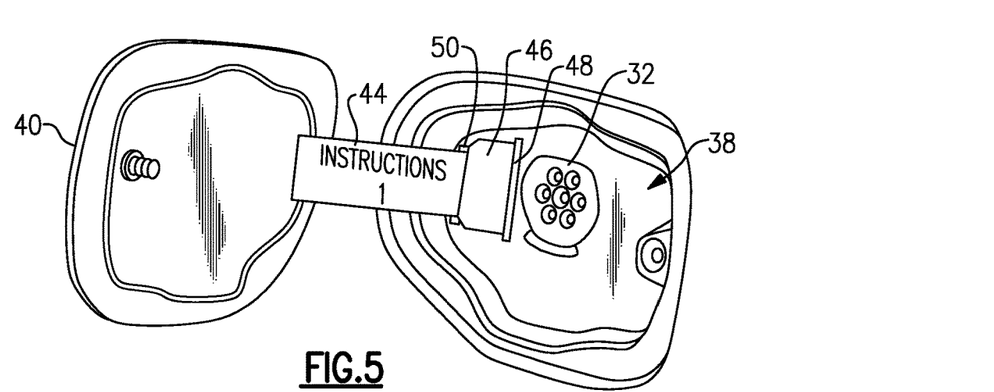
Figure 6:
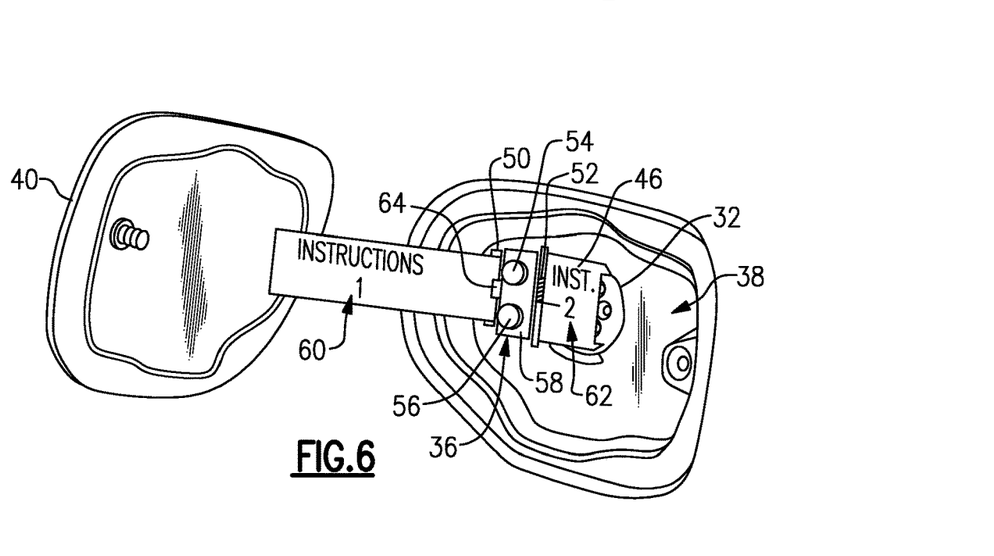
FIG. 6 is a view of the second embodiment of this disclosure with the charging port door in an extended open position.

FIGS. 5 and 6 illustrate another embodiment of this disclosure. In FIGS. 5 and 6, the flap 46 is not mounted to the arm 44. Rather, the flap 46 is mounted to a static portion of the recess 38 adjacent the arm 44 and adjacent the charging port 32. The hinged end 48 of the flap 46 is arranged vertically, extending generally up-and-down relative to the orientation in FIGS. 5 and 6, and the hinged end 48 is between the remote terminals 36 and the charging port 32. The remote terminals 36, in this example, are between the hinged end 48 and the arm 44.

In FIG. 5, the charging port door 40 is in the normal open position and the flap 46 covers the remote terminals 46. The flap 46 may be held in the position of FIG. 5 by one or more structures, such as a detent or deflectable tab. Continued movement of the charging port door to the extended open position of FIG. 6 causes a tab 64 on the arm 44 to urge move the flap 46 to rotate to the position of FIG. 6. In particular, the force of the tab 64 overcomes the force of the detent and/or tab holding the flap 46 in the position of FIG. 5 such that the flap 46 rotates to expose the remote terminals 36. In an example, the flap 46 rotates approximately 180° about the hinged end 48 between its positions in FIGS. 5 and 6.

As in the previous embodiments, a spring 52 adjacent the hinged end 48 biases the flap 46 to its position of FIG. 6. An elastomeric pad 58 also surrounds the lugs 54, 56. In the position of FIG. 6, the flap 46 substantially covers the charging port 32. Further, the first set of instructions 62 may be provided on the arm 44, while the second set of instructions 64 is provided on the flap 46 and visible when the flap 46 is in the position of FIG. 6.

Figure 7:
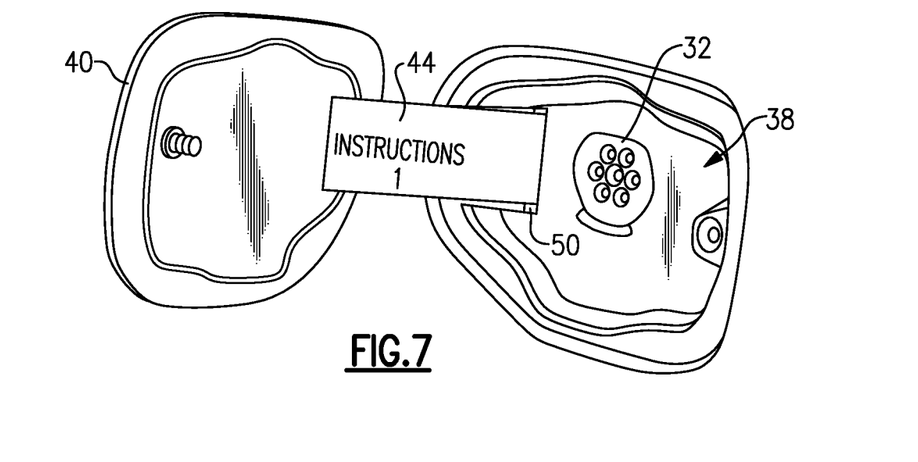
Figure 8:
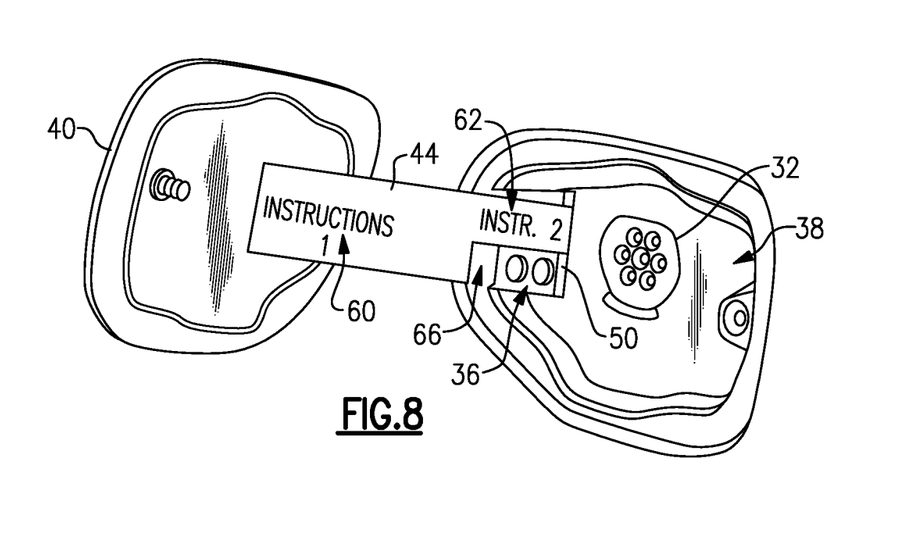
FIG. 8 is a view of the third embodiment of this disclosure with the charging port door in an extended open position.

FIGS. 7 and 8 illustrate another embodiment. In FIGS. 7 and 8, the arm 44 exhibits a variable height along its length. The height dimension is a vertical dimension, measured generally in the up-and-down direction relative to the orientation in FIGS. 7 and 8. In FIG. 7, with the charging port door 40 in the normal open position, the remote terminals 36 are not accessible. In FIG. 8, a notch 66 of the arm 44, which is a portion of the arm 44 that exhibits a reduced height relative to the remainder of the arm 44, extends out of the slot 50. The notch 66 is formed in a bottom edge of the arm 44, in this example, but the notch 66 could be formed in the top edge of the arm 44. The remote terminals 36 are accessible via the notch 66. In this example, the arm 44 is generally between the remote terminals 36 and the charging port 32. Further, the embodiment of FIGS. 7 and 8 may include one or more of the above-described features. For instance, the arm 44 includes both sets of instructions 60, 62, with the first set of instructions between the notch 66 and the charging port door 40, and the second set of instructions 62 is arranged generally above the notch 66. Further, an elastomeric pad may be provided adjacent the lugs of the remote terminals 36.

The remote terminals 36 are readily accessed from an exterior of the electrified vehicle 12. As such, the electrified vehicle 12 may be configured to prevent electronic tampering with the auxiliary battery 34 via the remote terminals 36. In this disclosure, electronic tampering means any electronic interference with the remote terminals 36 that may cause damage to the auxiliary battery 34 and/or the electrified vehicle 12. Examples of electronic tampering including shorting the remote terminals 36 by connecting them directly to one another, unauthorized discharging of the auxiliary battery 34 via the remote terminals, and introducing a voltage spike to the remote terminals 36. Electronic tampering may be intentional or unintentional. Accordingly, in this disclosure, the auxiliary battery 34 may be connected to the remote terminals 36 in a manner that prevents back-feeding of current from the auxiliary battery 34 to the remote terminals 36 and/or protects the auxiliary battery 34 from a voltage spike.

It should be understood that terms such as "about" and "substantially" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. An electrified vehicle, comprising:
a charging port configured to couple to a plug to charge the electrified vehicle;
remote terminals, wherein the electrified vehicle can be jump started via the remote terminals; and
a charging port door moveable between a closed position, a normal open position in which the charging port is accessible such that a plug may couple to the charging port to charge the electrified vehicle, and an extended open position in which the charging port door has moved beyond the normal open position, wherein the remote terminals are accessible when the charging port door is in the extended open position.

2. The electrified vehicle as recited in claim 1, wherein, when the charging port door is in the closed position, the charging port door covers and prevents access to both the charging port and the remote terminals.

3. The electrified vehicle as recited in claim 1, wherein, when the charging port door is in the normal open position, the remote terminals are inaccessible.

4. The electrified vehicle as recited in claim 3, wherein, when the charging port door is in the closed and normal open positions, a flap covers the remote terminals.

5. The electrified vehicle as recited in claim 4, wherein, when the charging port door is in the extended open position, the flap is permitted to move such that the remote terminals are accessible.

6. The electrified vehicle as recited in claim 5, wherein the flap is biased toward a position in which the remote terminals are accessible.

7. The electrified vehicle as recited in claim 6, wherein the charging port door is moveable relative to the charging port via an arm.

8. The electrified vehicle as recited in claim 7, wherein the remote terminals and the flap are on the arm.

9. The electrified vehicle as recited in claim 7, wherein:
the remote terminals and flap are adjacent the arm, and
the arm includes a tab configured to move the flap to expose the remote terminals as the charging port door moves from the normal open position to the extended open position.

10. The electrified vehicle as recited in claim 6, wherein, when the remote terminals are accessible, the flap covers the charging port such that a plug cannot be plugged into the charging port.

11. The electrified vehicle as recited in claim 3, wherein:
the charging port door is moveable relative to the charging port via an arm,
the arm includes a notch, and
when the charging port door is in the extended open position, the remote terminals are accessible via the notch.

12. The electrified vehicle as recited in claim 1, wherein when the charging port door is in the normal open position, a first set of instructions for moving the charging port door to the extended open position are visible.

13. The electrified vehicle as recited in claim 12, wherein, when the charging port door is in the extended open position, a second set of instructions for jump starting the electrified vehicle via the remote terminals are visible.

14. The electrified vehicle as recited in claim 1, wherein the charging port door is rotatable between the closed, normal open, and extended open positions.

15. The electrified vehicle as recited in claim 14, wherein, when in the extended open position, the charging port door is rotated about 30° beyond the normal open position.

16. The electrified vehicle as recited in claim 1, wherein:
the charging port is electrically coupled to a first battery capable of delivering power to propel the electrified vehicle, and
the remote terminals are electrically coupled to a second battery having a voltage less than the first battery.

17. A method, comprising:
moving a charging port door beyond a normal open position to an extended open position in which remote terminals are accessible, wherein an electrified vehicle can be jump started via the remote terminals.

18. The method as recited in claim 17, wherein the remote terminals are inaccessible when the charging port door is in the normal open position.

19. The method as recited in claim 18, wherein:
a flap covers the remote terminals when the charging port door is in the normal open position, and
the moving step causes the flap to move such that the remote terminals are accessible.

20. The method as recited in claim 19, wherein the moving step causes the flap to move such that a charging port is covered by the flap.

\* \* \* \* \*